J. W. WATTLES.

RINGS FOR RING AND TRAVELER SPINNING-MACHINES.

No. 7,857. Reissued Aug. 21, 1877.

Witnesses.
S. N. Piper.
L. M. Willey.

Inventor
Joseph W. Wattles.
by his attorney.
R. H. Eddy

N. PETERS, PHOTO-LITHOGRAPHER, WASHINGTON, D. C.

UNITED STATES PATENT OFFICE.

JOSEPH W. WATTLES, OF CANTON, MASSACHUSETTS.

IMPROVEMENT IN RINGS FOR RING AND TRAVELER SPINNING-MACHINES.

Specification forming part of Letters Patent No. 75,610, dated March 17, 1868; Reissue No. 3,165, dated October 20, 1868; Reissue No. 7,857, dated August 21, 1877; application filed June 23, 1877.

*To all whom it may concern:*

Be it known that I, JOSEPH W. WATTLES, of Canton, of the county of Norfolk and State of Massachusetts, have made a new and useful Invention for Supporting the Ring of a Ring and Traveler Spinning-Frame; and do hereby declare the same to be described in the following specification, and represented in the accompanying drawings, of which—

Figure 1:
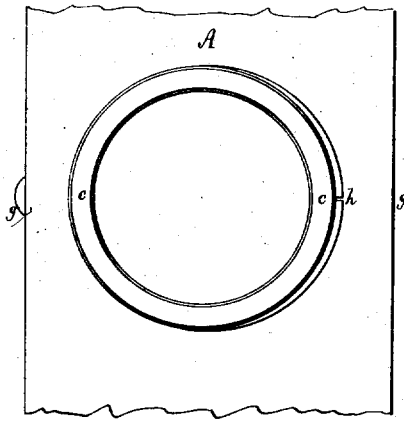
Figure 2:
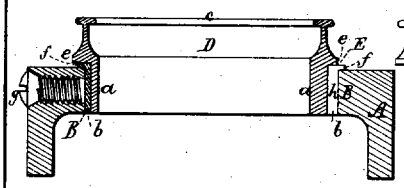
Figure 3:
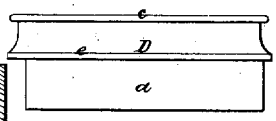
Figure 5:
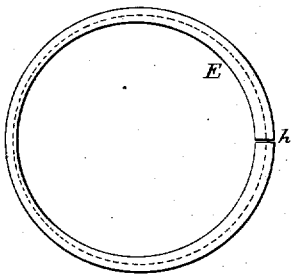
Figure 4:
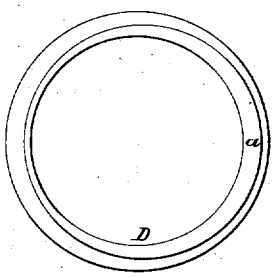
Figure 7:
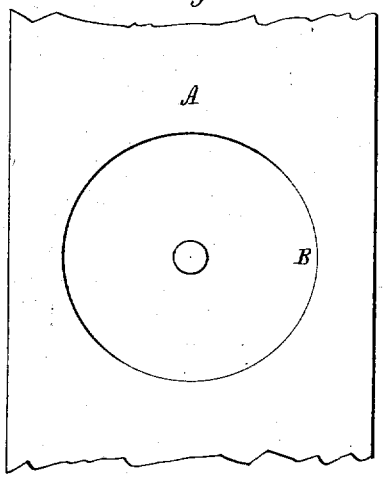
Figure 6:
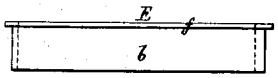

Figure 1 is a top view, and Fig. 2 a transverse section, of a spinning-ring and its supporting-rail with my invention applied thereto. Fig. 3 is a side elevation, and Fig. 4 an underside view, of the ring and its shank. Fig. 5 is a top view, and Fig. 6 a side view, of the ring-receiver. Fig. 7 is a top view of the ring-rail and spindle without the ring and its receiver.

My invention enables the ring and its receiver to be secured together and to the ring-rail by means of a single screw screwed into the rail, and by a contractile receiver arranged in the rail-socket and about the ring, the screw being to act against the outer periphery of the receiver. The said receiver I form as a thin ring, easily sprung or contracted diametrically by pressure of the set-screw used to hold it in place in the socket of the ring-rail. In order to have the receiver readily compressible on the shank of the ring such receiver is split transversely at one point of its circumference by sawing through it from its outer to its inner periphery, or by removing from the ring a small portion, so that it may not be an entire ring.

In the drawings, A denotes the ring-rail, and B the socket thereof for receiving the ring-receiver. The ring, as represented at D, is provided with a shank, *a*, to extend within the receiver E, of which *b* is the shank. The outer periphery of the shank of the ring is eccentric with respect to the race *c* and the bore of the ring. The bore of the receiver is cylindrical and eccentric relatively to the outer surfaces of the shanks of such receiver, the whole being as represented in the drawings. The supporting-flange of the ring is shown at *e*, and that of the receiver at *f*. The screw for holding together the ring and its receiver, and the latter within the socket of the ring-rail, is seen at *g* as screwed into the ring-rail and against the outer periphery of the shank of the receiver. The cross cut or opening of the receiver is represented at *h* in Fig. 5, the said receiver being what is usually termed a "split ring."

Figure 8:
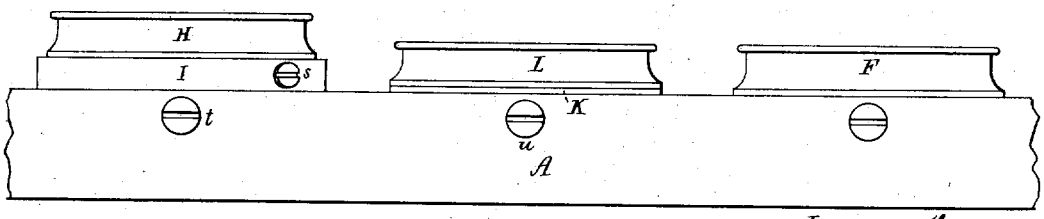

When, for the purpose of fastening the ring in the receiver, a screw inserted in the latter is employed, the receiver has to be elevated about one-fourth of an inch above the ring-rail, the same being as shown in Fig. 8, which is a side view of a ring-rail provided with such a receiver and a ring applied thereto. It also shows a receiver and ring and screw applied in accordance with my improvement. Besides such, it shows a common ring without any receiver, and held in place in the rail by a single screw. In the said Fig. 8, A denotes the ring-rail, F the common ring, H the ring with the elevated receiver I, which is an entire annulus holding the ring by means of a clamp-screw, *s*, screwed into it, the receiver, and against the shank of the ring, another screw, *t*, screwed into the rail, being employed to hold the receiver in the socket in the rail.

My improved receiver and ring are shown in such Fig. 8 at K and L, a single screw, *u*, screwed into the rail, serving to confine the receiver in place therein, and to contract it upon the ring.

By examination of Fig. 8 it will be seen that the top or upper surface of the ring L is no higher above the rail than that of the common ring F, while that of the elevated ring H is very much higher, in consequence of the necessary extension of the receiver I above the rail, to enable the screw *s* to be used in such receiver. This extra elevation of the ring above the rail causes the yarn to be laid out of place, or too high on the bobbin.

With my improvement, as the ring L in the receiver K stands no higher above the rail than does the common ring F, there will be no such improper laying of the yarn on the bobbin.

I do not claim a spinning-ring and its receiver constructed as shown in the United States Patent No. 68,185, the said receiver being an entire annulus, and provided with a screw screwed into it and against the ring, in order to confine the ring in its place in the receiver, a second screw being employed in the rail to confine the receiver in the socket thereof.

I claim—

1. The contractile ring-receiver E, as constructed, with or having the flange *f* and shank *b*, and the cross-cut *h* extending through them, whereby such receiver is rendered capable of being sprung or contracted upon the shank of a ring by a screw inserted in the rail and employed to confine the receiver in the socket of such rail, as set forth.

2. The combination of a spinning-machine ring and its supporting-rail, with a clamp-screw inserted in the latter, and with a ring-receiver, contractile, as described, and also inserted in the rail, whereby, by setting or screwing up the said screw against the ring-receiver, such receiver may be confined in place in the rail-socket, and be contracted upon the ring so as to hold it in position in the receiver, as set forth.

3. The combination of the contractile spinning-ring receiver, socketed to receive a ring, and inserted in a socket of the ring-rail, with a ring inserted in the receiver, and with a screw screwed into the rail and against the shank of such receiver, all substantially as set forth.

4. The combination of the single clamping-screw *g* with the ring-rail A, and with the contractile receiver E and its ring D, provided with eccentric shanks *a b*, all being substantially as set forth.

J. W. WATTLES.

Witnesses:
R. H. EDDY,
JOHN R. SNOW.